United States Patent

Hong

[11] Patent Number: 5,482,670
[45] Date of Patent: Jan. 9, 1996

[54] CEMENTED CARBIDE

[76] Inventor: Joonpyo Hong, 201 Rose Brier Dr., Rochester Hills, Mich. 48309-1124

[21] Appl. No.: 247,085

[22] Filed: May 20, 1994

[51] Int. Cl.$^6$ .............. C22C 32/00; B22F 1/00
[52] U.S. Cl. .................. 419/15; 419/37; 501/93; 75/236; 75/241; 75/242; 264/63
[58] Field of Search .............. 75/236, 241, 242; 419/5, 15, 37; 428/539.5; 501/93; 264/44, 63

[56] References Cited

U.S. PATENT DOCUMENTS

| | | | |
|---|---|---|---|
| 1,973,428 | 10/1934 | Comstock | 75/242 |
| 3,918,138 | 11/1975 | Nemeth et al. | 29/182.7 |
| 5,273,571 | 12/1993 | Mirchandani et al. | 75/242 |

*Primary Examiner*—Donald P. Walsh
*Assistant Examiner*—Anthony R. Chi

[57] ABSTRACT

This invention consists of two parts: "Cemented Carbide with Minimal Amount of Binder Metal", and "Nonmagnetic cemented Carbide".

The "Cemented Carbide with Minimal Amount of Binder Metal" is for cemented carbide bodies which are made from less than 2% binder metal powder and more than two kinds of metal carbide powder. Neither kind of carbide powder exceeds 98% of all the carbide powder used as raw material. The raw powder is to be prepared following a conventional powder metallurgy method—especially the conventional method of making cemented carbide—milling, cold pressing and non-high-pressure sintering. During the sintering process, metal carbide powder forms complicated solid solution carbides, and the small amount of binder which initially helped sintering is lost for the most part, if not entirely, during sintering.

The "Non-magnetic Cemented Carbide" is cemented carbides which have nickel-tungsten alloy as a binder metal. The process of manufacturing uses said conventional powder metallurgy. The purpose of this invention is to manufacture non-magnetic cemented carbide using more than two metal carbide powders and binder metal. More than one kind of metal carbides form solid solution carbide during the sintering process.

9 Claims, No Drawings

5,482,670

CEMENTED CARBIDE

SUMMARY OF THE INVENTION

This invention consists of two parts. The first part is for "Cemented Carbide with Minimal Amount of Binder Metal", and the second part is for "Nonmagnetic Cemented Carbide".

The invention, "Non-magnetic Cemented Carbide", is for making a little or no binder cemented carbide material without using high pressure processes such as hot isostatic pressing (HIP), hot pressing, or rapid omnidirectional compaction (ROC).

Cemented carbide is a relatively tough and hard composite material which contains metal which is tough, and carbide which is hard. This cemented carbide is an excellent material and is used for parts needing wear resistance and for tools. In cemented carbide compositions, the metal matrix phase is relatively more vulnerable to abrasive wear and corrosion. If the said cemented carbide part is exposed to abrasive particles or to a chemically corrosive environment, the relatively weak metal phase is lost, leaving porosities. Later these porosities become the initial points for fracture. For the applications where parts are exposed to corrosive or abrasive environments and the said parts are exposed to moderate stress , non- or little binder cemented carbide would work better. Generally, cemented carbide without binder metal has lots of porosity. The purpose of this invention is to make a good quality cemented carbide with little or no binder, without high pressure treatment such as HIP, ROC or Hot Pressing.

The cemented carbide composite of this invention is made from less than 2 percent by weight metal powder; the balance is cemented carbide powders. During the sintering process, especially a vacuum sintering process, a portion of metal binder is lost by evaporation. In the final sintered product, little binder metal is left. Depending on the carbon contents, this residual metal could form inter-metallic composites along with carbon and metal from the carbide. Because of the brittle nature of the inter-metallic composite, generally, it is better to avoid this structure by appropriate carbon amount and composition of the said cemented carbide. Here the metal powder includes cobalt, nickel, iron, molybdenum, chromium powder, and alloy powders containing the above metals, and mixtures of one or more said metals and alloy powders of the said metal.

The metal carbide part of this cemented carbide consists of single metal carbides, and solid solution carbides of two or more metal carbides, the said metal carbides include carbides of transition metals of IV-A and V-A in periodic table, molybdenum, and chromium.

This said cemented carbide could contain less than 1 percent by weight impurities or other elements could be contained in the said cemented carbide for enhancing mechanical, chemical or physical properties.

The invention, "Non-magnetic Cemented Carbide" is for making non-magnetic cemented carbide body by adding carbide forming metals other than titanium. For certain applications of the cemented carbide, a titanium containing part may not be acceptable. The manufacturers would have more freedom to make non-magnetic cemented carbide if they could use a variety of carbide forming metals, not only titanium metal. The manufacturers would also have a greater freedom in not only the manufacturing process, but also in tailoring better micro-structures of the said cemented carbides for certain applications.

BACKGROUND OF THE INVENTION

The invention, "Cemented Carbide with Minimal Amount of Binder Metal" involves cemented carbide bodies containing little or no metal binder. For certain applications, it is desirable for cemented carbide wear resistant parts and tools to have little binder metal. The earlier U.S. Pat. No. 4,945,073 is for binderless carbide made via a reaction sintering process using tungsten metal and carbon from a polymer, and U.S. Pat. No. 4,945,673 is for a binderless carbide made via a ROC (Rapid Omnidirectional Compaction) Process. This invention is for a product and for a process to make high quality cemented carbide bodies with low or no binder metal, without using high pressure.

Concerning non-magnetic cemented carbide, cemented carbide with nickel binder can be converted to non-magnetic cemented carbide by adjusting the carbon amount: U.S. Pat. No. 3,918,138 is for adjusting the carbon in nickel base cemented carbide by adding titanium metal during the powder milling process. This invention is for adding carbide forming metal other than titanium metal, as well as metal carbides to make high quality products as well as necessary micro-structures.

DETAILED DESCRIPTION OF INVENTION

The microstructure of this said cemented carbide composite with minimal amount of binder metal shows very little binder metal between carbide particles, and semi-continuous solid-solution carbide which fills up the spaces between carbide particles, and discrete carbide particles, wherein said metal carbide means single metal carbide. Solid solution carbide consists of two or more metal carbides and is sometimes called composite carbide or beta-phase carbide. This composite carbide is partially continuous and partially surrounds the carbide particles, which look like the binder metal in ordinary cemented carbide composite. This may be one of the reasons this said cemented carbide has little porosity even though it contains little binder metal.

Although both vacuum and hydrogen furnace sintering can be used as a sintering process, vacuum sintering is the preferred method. Here, "hydrogen furnace" means a furnace used for sintering in either a hydrogen or an inert atmosphere of about one atmospheric pressure, and "vacuum furnace" means a furnace used for sintering at below one atmospheric pressure of hydrogen or inert gas. During the sintering process, some metal binder is lost by evaporation. The evaporation is heavier during a vacuum sintering process than during an atmospheric pressure sintering process. In this invention, "Cemented Carbide with Minimal Amount of Binder Metal", a small amount of metal is used to help the sintering, and in order to leave less metal in the sintered part, vacuum sintering is the preferred method.

The manufacturing method of this invention is well known in the art of powder metallurgy. Raw materials, metal carbide powders and metal powders, are milled using a ball mill or other conventional method: and then, typically, a 1 to 3 percent by weight organic binder is mixed with the milled powder. Then the powder mixture is introduced into a mold cavity and pressurized to make a so called "green part". Wax is introduced in the powder, either before the milling process or after milling and drying. Wax acts as a lubricant in the molding process and helps maintain the molded shape before sintering. Generally the powder containing the organic binder is pelletized before the molding process to help the following molding process, in which powder is generally gravity fed to the mold. Spray drying or other methods are used as this pelletizing process. This milled and waxed powder is called "grade powder". There are various methods to make green parts such as cold dye pressing, extrusion or slip casting, etc. Sometimes, the parts are formed first, and then machined before sintering. Sometimes parts are pre-sintered at a lower temperature and machined to the appropriate shape, and then the part is fully sintered. Generally sintering is conducted between 1350 degrees C and 1600 degrees C.

The metal carbide raw materials of this invention, can be mixtures of single metal carbide powders or solid solution carbides of more than one metal carbide. The raw carbide powders forms more complicated solid solution carbides during the sintering process. This solid solution forming process is believed to help reduce defects and produce good quality products.

Detailed descriptions of nickel-tungsten binder carbide is as follows: Nickel metal powder, and metal carbide powders including tungsten carbide, and also more than 7 atomic percent of carbide forming metal powder are used as raw material for the said nickel-tungsten binder non-magnetic cemented carbide. The raw materials are milled and waxed and sintered. Non-magnetic cemented carbide can be made by forming a tungsten-nickel alloy binder while the sintering process. Here, added metal powder includes tungsten, tantalum, molybdenum, chromium, vanadium, niobium, zirconium, hafnium and alloys of said carbide forming metals including titanium. Also alloy powders of nickel with one or more said carbide forming metals can be included as raw material. Here, metal carbide includes tungsten carbide, titanium carbide, tantalum carbide, zirconium carbide, hafnium carbide, niobium carbide and vanadium carbide chromium carbide, and also solid solution carbides of said metal carbide. If exact the amount of carbon is measured for each element of raw material, the exact metal amount can be calculated to make non-magnetic cemented carbide. In reality, the necessary amount should be determined by experiment because the nickel base binder forms complicated alloys including small amounts of all the constituent materials. Also sintering conditions such as using a hydrogen atmosphere or vacuum, and sintering furnace will effect the final carbon amount. The added metals' carbon affinity—how it is a stronger carbide former—also affects the non-magnetic character of final product. Therefore the appropriate amount has to be determined by experiment. Chromium or molybdenum metals or their carbides also can be added to the non-magnetic cemented carbide.

The manufacturing method of this said non-magnetic cemented carbide is also the said art of powder metallurgy. Preferably, the nickel-tungsten alloy binder non-magnetic cemented carbides contain tungsten carbide as majority constituent carbide and enough other metal carbides to form said solid solution carbide to help reduce porosity via said solid solution forming process.

EXAMPLES

EXAMPLE 1

By weight, 92.5% WC, 7% MoC and 0.5% Co powder were bal 1 milled for 24 hours and a 1.5% paraffin wax was added, then the powder was pressed in a die to form a piece and sintered at 1500 degree C. The sintered piece showed good quality and high hardness; a porosity level of A02B00C00 on the ASTM (American Standard for Testing and Material ) standard B276, and a hardness of 95.2 on the Rockwell A scale.

EXAMPLE 2

By weight, 90% WC 6% MoC, 1% TaC 0.5% TiC, 1.5% $Cr_3C_2$, 1% Co powder was processed the same way as in EXAMPLE 1. The sintered piece showed high quality and high hardness as EXAMPLE 1: a porosity level of A02B02C00 on the ASTM standard B276, and a hardness of 94.9 on Rockwell A scale.

EXAMPLE 3

By weight, 91.1% WC, 7.5% MoC, 1% $Cr_3C_2$, 0.4% Co powder was processed the same way as in EXAMPLE 1. The sintered piece showed good quality and result: a porosity level of A02B02C00 on the ASTM standard B276, and a hardness of 95.3 on the Rockwell A scale.

EXAMPLE 4

By weight, 96.4% WC, 1% TaC, 0.8% TiC, 1.2% $Cr_3C_2$ and 0.6% Co powder were processed in the same way as in EXAMPLE 1, and same good results were obtained: a porosity level of A02B02C00 on the ASTM standard B276, and a hardness of 95.2 on the Rockwell A scale.

EXAMPLE 5

By weight, 91.8% WC, 8% MoC and 0.2% Co powder were processed the same as EXAMPLE 1, and the same good results were obtained: porosity A02B02C00 on the ASTM B276, and a hardness of 95.0 on the Rockwell A scale.

EXAMPLE 6

By weight, 96.4% WC, 1% TaC, 0.8% TiC, 1.2% $Cr_3C_2$ 0.6% Ni were processed the same as EXAMPLE 1, and the specimen had a porosity of A04B02C00 on the ASTM B276, and a hardness of 94.9 on the Rockwell A scale.

EXAMPLE 7

By weight, 92.5% WC, 7% MoC, 0.3% Co and 0.2% Fe powder were processed the same as in EXAMPLE 1, and the specimen had an A02B02C00 porosity on the ASTM B276, and a hardness of 95.0 on the Rockwell A scale.

EXAMPLE 8

By weight, 86.78% tungsten carbide, 2% tantalum carbide, 1% titanium carbide, 0.1% chromium carbide, 0.12% tantalum metal, 10% nickel metal powder were processed the same as EXAMPLE 1. The specimen was nonmagnetic and showed a porosity level of A02B02C00 on the ASTM B276 Standard.

EXAMPLE 9

By weight, 89.88% tungsten carbide, 10% nickel, 0.12% tungsten metal powder were processed the same as EXAMPLE 1. The specimen was non magnetic and had the same good quality as EXAMPLE 8.

What the claim is:

1. A method for making non-magnetic nickel-tungsten binder cemented carbide composite comprising:

i) forming a resultant mixture by milling together a mixture comprising carbide forming metal powders, metal carbide powders, and nickel metal powder, wherein carbide forming metal powders are one or more of tungsten, tantalum, molybdenum, chromium, vanadium, niobium, zirconium, hafnium and alloys of carbide forming metals including titanium, wherein metal carbide powers are tungsten carbide, and non or more of metal carbides which include titanium carbide, tantalum carbide, molybdenum carbide, zirconium carbide, hafnium carbide, niobium carbide, vanadium carbide and chromium carbide, and also solid solution carbide of metal carbides;

ii) forming a green compact with the resultant mixture;

iii) sintering the green compact, wherein the said carbide forming metals are added to the mixture in an amount to adjust the total carbon content in said mixture in order to form a nonmagnetic nickel-tungsten alloy binder cemented carbide composite while the green compact is being sintered.

2. A method for making a carbide composite comprising:

i) choosing a binder material from the powdered metals including cobalt, nickel , and iron, alloys of said powder metals, mixtures of said powdered metals and alloys of said powdered metals;

ii) choosing a carbide powder mixture from one or more powdered carbides of carbide forming metals, and solid solution carbide powders of said carbide forming metals, and said carbide forming metals and alloys with appropriate amount of carbon or carbon producing materials;

iii) mixing and milling said binder material with said carbide powder mixture thereby forming a resultant mixture;

iv) forming a green compact with the resultant mixture;

v) sintering the green compact;

provided that;

a) the carbide forming metals include tungsten, tantalum, molybdenum, vanadium, niobium, zirconium, hafnium, a sufficient amount of binder material is added to the carbide powder mixture to facilitate sintering and a significant amount of the binder material evaporates during sintering thereby resulting in a sintered carbide composite containing less binder material than said resultant mixture, and wherein the amount of binder material present in the sintered carbide composite is less than about 1% by weight of said carbide composite, and the amount of binder material added to said carbide powder mixture is less than about 2% by weight of said resultant mixture.

3. The method according to claim 2, wherein the green compact sintered at or below atmospheric pressure.

4. The method according to claim 2, wherein the binder material is cobalt.

5. The method according to claim 2 wherein the resultant mixture comprises more than 80% by weight tungsten carbide powder, less than 20 percent by weight molybdenum carbide powder, and cobalt powder.

6. The method according to claim 2 wherein the resultant mixture comprises more than 60 percent by weight tungsten carbide powder, less than 10 percent by weight tantalum carbide powder, less than 6 percent by weight titanium carbide powder, less than 6 percent by weight chromium carbide powder, and cobalt powder.

7. Carbide composite made by the process according to claims 2, 3, 4, 5 or 6.

8. The method according to claim 2 wherein the carbide powder mixture contains two or more carbide forming metals which are in the form of metal carbides, alloys, or metals themselves, provided that any one carbide forming metal does not exceed 98 percent by weight of the total carbide forming metals contained in the carbide powder mixture.

9. The carbide composite made by the process according to claim 8.

* * * * *